(12) United States Patent
Iida

(10) Patent No.: US 6,330,212 B1
(45) Date of Patent: Dec. 11, 2001

(54) DISK DRIVE DEVICE

(75) Inventor: Michihiko Iida, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/512,424

(22) Filed: Feb. 24, 2000

(30) Foreign Application Priority Data

Feb. 25, 1999 (JP) ................................................. 11-048104

(51) Int. Cl.[7] ............................................... G11B 17/22
(52) U.S. Cl. ............................................... 369/32; 369/94
(58) Field of Search ............................... 369/32, 33, 94, 369/275.1, 44.25, 44.27, 44.28, 44.29, 44.37

(56) References Cited

U.S. PATENT DOCUMENTS

| | | | |
|---|---|---|---|
| 5,696,743 | * 12/1997 | Kawasaki | 369/32 |
| 5,740,136 | * 4/1998 | Tsutsui et al. | 369/94 |
| 5,781,516 | * 7/1998 | Yamada | 369/32 |
| 5,793,721 | * 8/1998 | Akkermans | 369/94 |
| 5,903,530 | * 5/1999 | Tateishi et al. | 369/94 |
| 5,920,527 | * 7/1999 | Aoki | 369/32 |
| 5,999,503 | * 12/1999 | Tateishi et al. | 369/44.29 |
| 6,061,310 | * 5/2000 | Iida | 369/44.27 |
| 6,091,680 | * 7/2000 | Matsuda et al. | 369/44.29 |
| 6,101,156 | * 8/2000 | Tanaka et al. | 369/44.28 |
| 6,104,019 | * 8/2000 | Yokota | 250/201.5 |
| 6,134,196 | * 10/2000 | Sato et al. | 369/94 |
| 6,147,942 | * 11/2000 | Abe et al. | 369/94 |

* cited by examiner

Primary Examiner—Tan Dinh
(74) Attorney, Agent, or Firm—Oblon, Spivak, McClelland, Maier & Neustadt, P.C.

(57) ABSTRACT

A disk drive device constructed so that when an access operation is carried out between different signal-record surfaces of a disk having a layered structure with a plurality of signal-record surfaces, focus jumping is executed to a disk radial location corresponding to whichever of the current address location and the target address location that is closer to the inner periphery of the disk which is only slightly affected by disk-surface shaking. In the disk drive device, the access operation is more quickly completed by executing a seek operation in which the probability with which a focus jump error caused by disk shaking occurs is minimized.

2 Claims, 6 Drawing Sheets

DISK DRIVE DEVICE

BACKGROUND OF THE INVENTION

1. Field of the Invention

The present invention relates to a disk drive device adapted for use with a disk-shaped recording medium in order to perform a recording and a reproducing operation thereon, and more particularly to a technology for performing a seek operation to a target location on a disk-shaped recording medium having a layered structure with a plurality of signal-record surfaces.

2. Description of the Related Art

For example, compact disks, such as what are called compact disk-read only memories (CD-ROMs), and digital versatile disks/digital video disks (DVDS) have been developed as optical-disk-type recording media.

In disk drive devices adapted for use with these types of optical disk, tracks on the disk being rotated by a spindle motor are irradiated with laser beams from an optical pickup. Data on the disk is read by detecting laser beams reflected from the disk. Data is recorded onto the disk by irradiating laser beams modulated by recording data.

In order to perform a recording and a reproducing operation using laser beams, a laser beam spot needs to be kept focused on a recording surface of the disk. For this reason, a focus servo mechanism is incorporated in the disk drive device in order to control the state of focus of the laser beam spot by moving an objective lens, being a laser beam output end, towards or away from the disk. The focus servo mechanism usually comprises a biaxial mechanism and a focus servo circuit system. The biaxial mechanism comprises a focusing coil and a tracking coil. The focusing coil is used to move the objective lens so that it moves towards and away from the disk. The tracking coil is used to move the objective lens in a radial direction of the disk. The focus servo circuit system is used to generate a focus error signal (or a signal indicating the amount of displacement from the focused-state location) based on information carried by the laser beams reflected from the disk. Then, based on the generated focus error signal, it generates a focus drive signal, which is applied to the focusing coil of the biaxial mechanism.

In other words, the focus servo mechanism is constructed as a feedback control system.

It is well known that the range within which the objective lens can be drawn in to bring it to a focused state based on the focus error signal is a very narrow range where an S-shaped curve of the focus error signal is observed. Therefore, in order to properly operate a focus servo, it is, in general, necessary to carry out a focus search operation as an operation to be carried out when a focus servo loop is turned on.

In the focus search operation, a focus drive signal is applied to the focusing coil to force the objective lens to move in a focusing stroke range. At this time, when a focus error signal is observed, an S-shaped curve is observed when the objective lens is located in a certain range. The focus servo is turned on at a timing in which a linear area of the S-shaped curve of the focus error signal appears (or at a zero cross timing).

Some types of disk have a layered structure with a plurality of recording surfaces. For example, the above-described DVD generally has two signal-record surfaces, called layer 0 and layer 1.

The structure of a DVD with two signal-record surfaces is illustrated in FIG. 7.

As illustrated in FIG. 7, the diameter and thickness of the DVD are 12 cm and 1.2 mm, respectively.

The DVD layered structure includes a disk substrate (or a transparent layer) 101, which is formed at a disk surface 108 side. The disk substrate 101 is formed of transparent synthetic resin with high light transmittance and mechanical and chemical resistant properties. Examples of synthetic resin include transparent polycarbonate resin, polyvinyl chloride resin, and acrylic resin.

Pits are transferred onto one of the main surfaces of the disk substrate 101 by a stamper incorporated in a die in order to form a first signal-record surface 102. The pits in the first signal-record surface 102 are small holes in the disk substrate 101 and form recording tracks. The small holes are encoded holes with different circumferential lengths in correspondence with predetermined information signals.

Through a first reflective layer 103 formed in correspondence with the first signal-record surface 102, a second signal-record surface 104 and a second reflective layer 105 formed in correspondence with the second signal-record surface 104 are formed. Similarly to the first signal-record surface 102, pits are also formed in the second signal-record surface 104 in correspondence with information signals.

An adhesive surface 106 is formed on the second reflective layer 105. A dummy plate 107 is adhered to the second reflective layer 105 through the adhesive surface 106.

Laser beams from the disk drive device strike the DVD from the disk-surface-108 side. Data recorded on the first signal-record surface 102 or the second signal-record surface 104 is detected from laser beams reflected therefrom.

The first reflective layer 103 is a semi-transparent film which allows a certain proportion of the laser beams to be reflected. Therefore, when the laser beams are focused on the first signal-record surface 102, a signal recorded on the first signal-record surface 102 can be read from the laser beams reflected from the first reflective layer 103. On the other hand, when the laser beams are to be focused on the second signal-record surface 104, the laser beams pass through the first reflective layer 103 and are gathered at the second signal-record surface 104, allowing a signal recorded on the second signal-record surface 104 to be read from the laser beams reflected from the second reflective layer 105.

When a disk having a plurality of signal-record surfaces, such as a two-layered DVD, is used, the focus servo mechanism needs to focus laser beams on each of the signal-record surfaces. In other words, the focus servo mechanism needs to function in such a way that when laser beams are focused on a signal-record surface, a focus jump operation is executed to focus the light beams on another signal-record surface.

The focus jump operation is executed by turning off the focus servo and forcing the objective lens to move when the laser beams are focused on a signal-record surface, and turning on the focus servo at a moment the objective lens arrives within a focusing drawing-in range with respect to another signal-record surface (that is, at a moment an S-shaped curve is observed). In other words, the focus jump operation is carried out similarly to the above-described focus search operation.

The focus search operation may, for example, be carried out when making an access to a required address at another signal-record surface from the signal-record surface currently being subjected to a recording or a reproducing operation when the objective lens is in focus.

Here, one general way of carrying out the seek operation is to execute focus jumping from a current address location at a signal-record surface to another signal-record surface in order to seek a target location at the signal-record surface reached by the focus jump operation.

In general, when a focus jump operation is to be carried out, considering shaking of the disk surface, the objective lens is moved with an acceleration which is larger than the disk-surface-shaking acceleration in order to reduce the effects of outside disturbances.

However, when a disk which shakes greatly is used, the focus of the objective lens is considerably displaced within a rotational period of the disk. In addition, since the disk rotates while its center is being supported, disk-surface shaking becomes greater towards the outer periphery of the disk. Therefore, even when a focus jump operation is carried out by performing an objective lens movement control operation which takes into account disk-surface shaking to a certain extent, the focus jump operation may not be successfully carried out because a compromise needs to be made between the amount of disk-surface shaking and the focus jump location. In this case, a re-try operation is executed until the focus jump operation is completed. This results in a delay in starting a reproducing operation at a target location.

SUMMARY OF THE INVENTION

Accordingly, it is an object of the present invention to make it possible to quickly complete an access operation by executing a seek operation in which the occurrence of a focus jump operation error caused by disk-surface shaking is minimized.

To this end, there is provided a disk drive device for recording data onto or reproducing data from a disk-shaped recording medium having a layered structure with a plurality of signal-record surfaces by irradiating the signal-record surfaces with laser beams, the disk drive device comprising:

pickup means including at least a laser beam source, an objective lens being an output end of the laser beams, and a detecting section for detecting the laser beams reflected from the recording medium;

objective-lens moving means for setting the objective lens in a focused state with respect to any one of the signal-record surfaces of the recording medium by moving the objective lens towards or away from the recording medium;

focus jump controlling means for controlling the objective-lens moving means so that a location where the objective lens focuses the laser beams jumps from a certain signal-record surface to another signal-record surface;

disk-radial-direction moving means for changing a position of the objective lens relative to the disk-shaped recording medium in a radial direction thereof; and seek operation controlling means for controlling the objective-lens moving means so that the objective lens moves from a current address location where the objective lens is currently focused to a target address location situated at another signal-record surface which is different from the signal-record surface where the current address location is situated;

wherein a first seek controlling operation is executed in which when the seek operation controlling means determines that the target address location is situated closer to an inner periphery of the disk than the current address location, the disk-radial-direction moving means is controlled so that the objective lens moves along the signal-record surface where the current address location is situated to a radial location of the disk-shaped recording medium corresponding to the target address location, and the focus jump controlling means is controlled so that the focus jumping is carried out to the signal-record surface where the target address location is situated from the disk radial location reached after completion of the transferring of the objective lens; and a second seek controlling operation is executed in which when the seek operation controlling means determines that the target address location is situated closer to an outer periphery of the disk than the current address location, the focus jump controlling means is operated so that the focus jumping is carried out from the current address location to a radial location of the signal-record surface where the target address location is situated, and the disk-radial-direction moving means is controlled so that the objective lens moves from the disk radial location reached after completion of the focus jumping to a radial location of the disk-shaped recording medium situated in correspondence with the target address.

In the above-described structure, when access is being made from a signal-record surface to another signal-record surface of the disk having a layered structure with a plurality of signal-record surfaces, focus jumping is executed to a disk radial location corresponding to whichever of the current address location and the target address location that is closer to the inner periphery of the disk.

DESCRIPTION OF THE PREFERRED EMBODIMENT

Hereunder, a description will be given of an embodiment of the disk drive device in accordance with the present invention.

Figure 7:
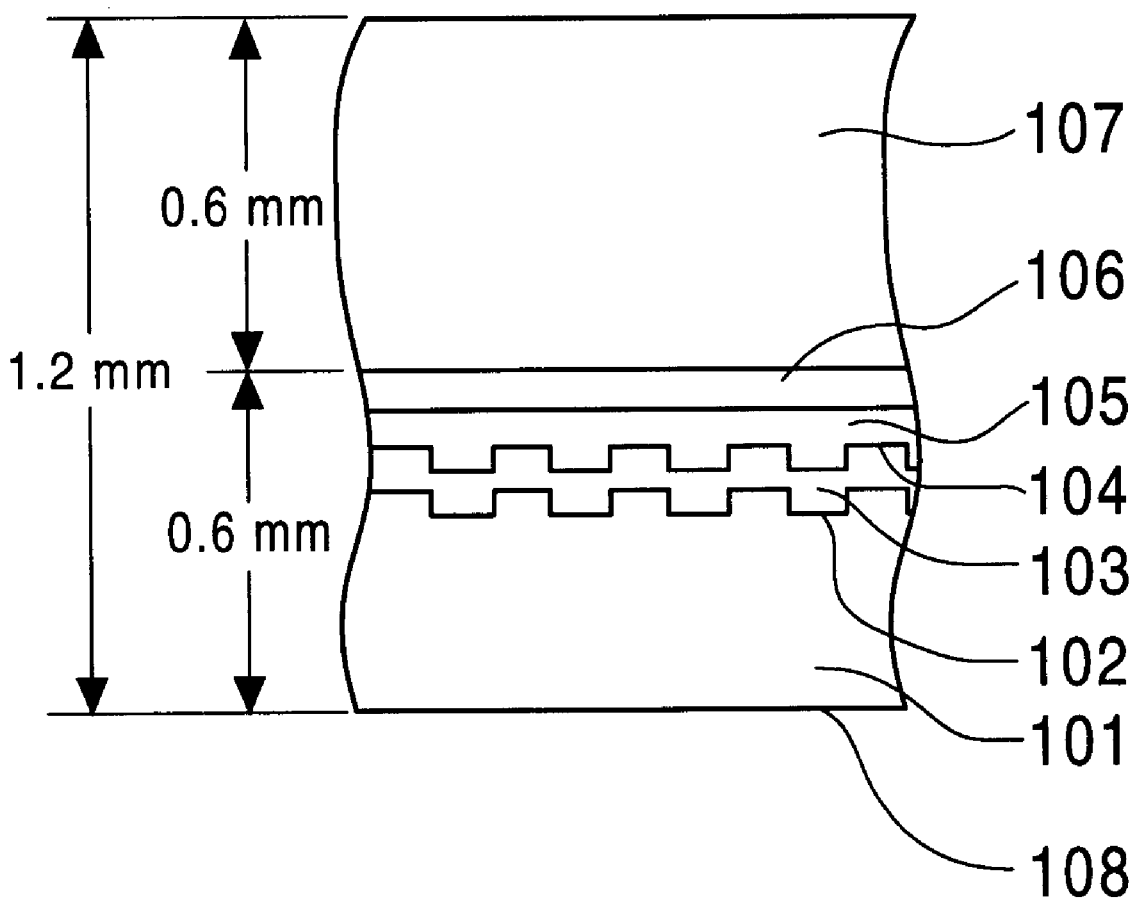
FIG. 7 is a sectional view illustrating an example of the structure of the disk used in the embodiment of the present invention.

The optical disk loaded into the disk drive device of the embodiment of the present invention is, for example, a DVD. The disk drive device is constructed so that it can perform a recording and a reproducing operation on, in particular, a disk having two layered signal record surfaces shown in FIG. 7. Obviously, the present invention may be applied to other types of optical disk. However, the focus jump operation, carried out during a seek operation, which is a characteristic operation of the present invention is suitable for being performed on a disk having a layered structure with a plurality of signal-record surfaces.

Figure 1:
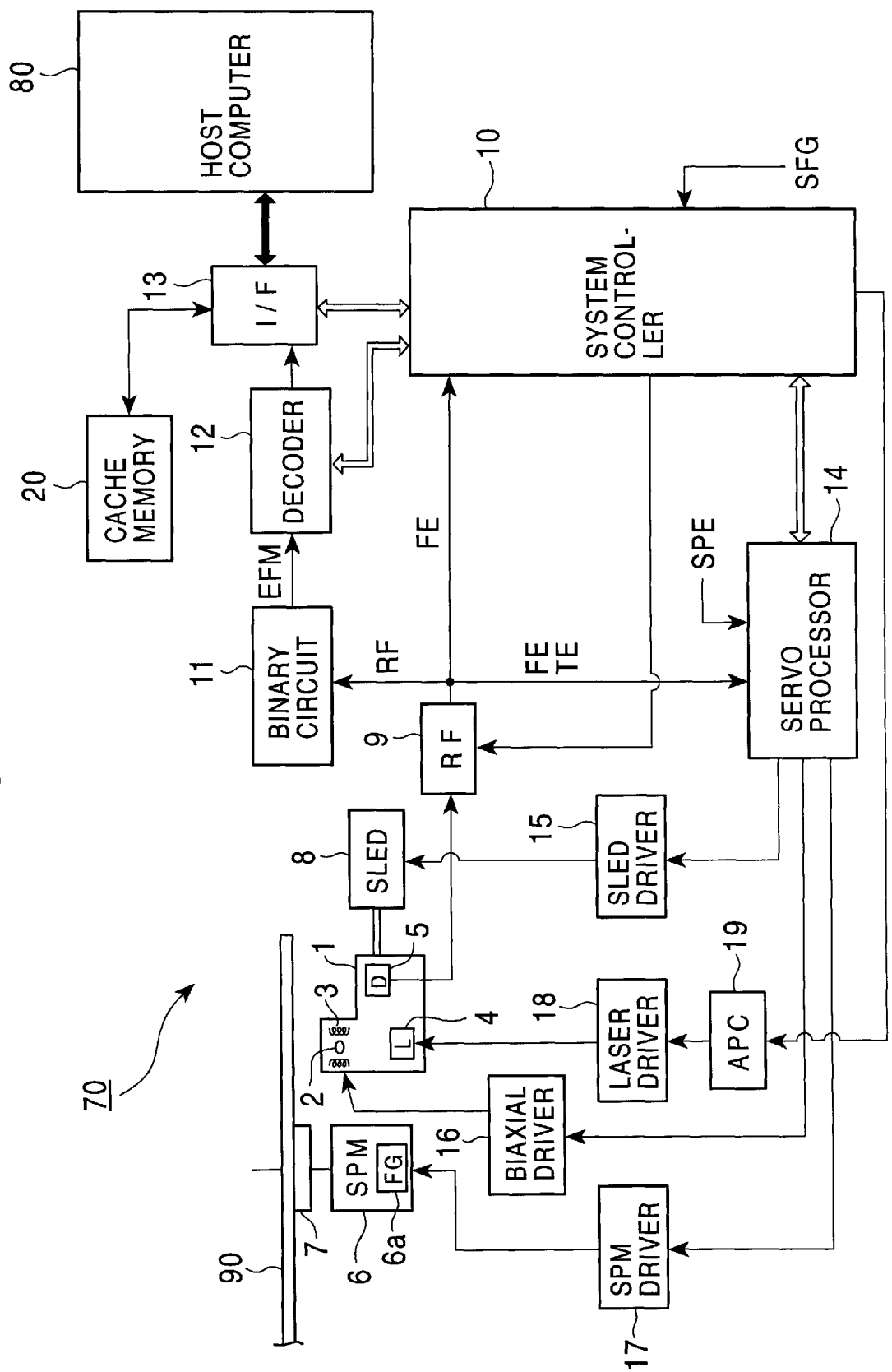
FIG. 1 is a block diagram illustrating a structure of an embodiment of the disk drive device in accordance with the present invention.

FIG. 1 is a block diagram of the main portions of the disk drive device 70 of the embodiment.

A disk 90 is placed on a turntable 7. During a reproducing operation, it is rotationally driven at a constant linear velocity (CLV) or a constant angular velocity (CAV) by a spindle motor 6. A pickup 1 is used to read out data recorded on the disk 90 in the form of, for example, emboss pits or phase-change pits.

The spindle motor 6 incorporates a spindle FG (or a spindle frequency generator) 6a to execute a servo control operation. It can generate a pulse SFG (hereinafter also sometimes called FG pulse SFG) in synchronism with the rotation of the spindle motor 6. Based on the pulse SFG generated from the spindle FG 6a, a system controller 10 detects information concerning the rotation of the spindle motor 6.

The pickup 1 includes therein a laser diode 4 serving as a laser beam source; a photodetector 5 for detecting reflected laser beams; an objective lens 2 being a laser-beam-output end; and an optical system for irradiating signal-record surfaces with laser beams through the objective lens 2 or for guiding the reflected light beams to the photodetector 5.

The objective lens 2 is held by a biaxial mechanism 3 so as to be movable in a tracking direction and a focusing direction.

The entire pickup 1 can be made to move in a disk radial direction by a sled mechanism 8.

Information carried by laser beams reflected from the disk 90 is detected by the photodetector 5. To an RF amplifier 9 are supplied the laser beams in the form electrical (current) signals in accordance with the amount of light received by the photodetector 5.

The RF amplifier 9 comprises a current-voltage converting circuit, a matrix computing/amplifying circuit, etc., which operate in correspondence with electrical current output from a plurality of light-receiving elements of the photodetector 5. By matrix computation, the RF amplifier 9 generates necessary signals, such as an RF signal carrying reproduction data, a focus error signal FE used for performing a servo control operation, and a tracking error signal TE.

The reproduction RF signal output from the RF amplifier 9 is sent to a binary circuit 11, while the focus error signal FE and the tracking error signal TE are supplied to a servo processor 14.

The reproduction RF signal obtained from the RF amplifier 9 is converted into a binary signal at the binary circuit 11, so that it is converted into what is called an EFM+signal (or an 8–16 demodulation signal), and supplied to a decoder 12. At the decoder 12, EFM+demodulation, error correction, etc. are carried out. If necessary, MPEG decoding is carried out to reproduce data read from the disk 90.

The decoder 12 stores the decoded data in a cache memory 20 serving as a data buffer.

The reproduced data is transferred and output from the disk drive device 70 as a result of reading out the data temporarily stored in the cache memory 20.

An interface 13 is connected to an external host computer 80, and is used for transmitting and receiving, for example, reproduced data or a read command to and from the host computer 80.

In other words, the reproduced data stored in the cache memory 20 is transmitted and output to the host computer 80 through the interface 13.

The read command signal and the like from the host computer 80 are supplied to the system controller 10 through the interface 13.

From the focusing error signal FE and the tracking error signal TE from the RF amplifier 9, and a spindle error signal SPE from the decoder 12 or the system controller 10, the servo processor 14 generates various servo drive signals (a focus drive signal, a tracking drive signal, a sled drive signal, and a spindle drive signal) in order to execute a servo operation.

In other words, in correspondence with the focus error signal FE and the tracking error signal TE, a focus drive signal and a tracking drive signal are generated and supplied to a biaxial driver 16. The biaxial driver 16 drives a focusing coil and a tracking coil of the biaxial mechanism 3 in the pickup 1. Accordingly, a tracking servo loop and a focus servo loop are formed using the pickup 1, the RF amplifier 9, the servo processor 14, the biaxial driver 16, and the biaxial mechanism 3.

When turning on a focus servo, a focus search operation must first be executed. The focus search operation is carried out to detect the location where an S-shaped curve of the focus error signal FE is obtained while forcing the objective lens 2 to move when the focus servo is in an off state. As is known conventionally, the linear areas of the S-shaped curves of the focus error signal define ranges within which the objective lens 2 can be drawn in to bring it to a focused state by closing the focus servo loop. Therefore, while forcing the objective lens 2 to move while the focus search operation is being carried out, the ranges in which the objective lens 2 can be drawn in are detected in order to turn on the focus servo at a timing of detection, after which the focus servo operation is carried out to keep a laser spot in a focused state.

Figure 2:
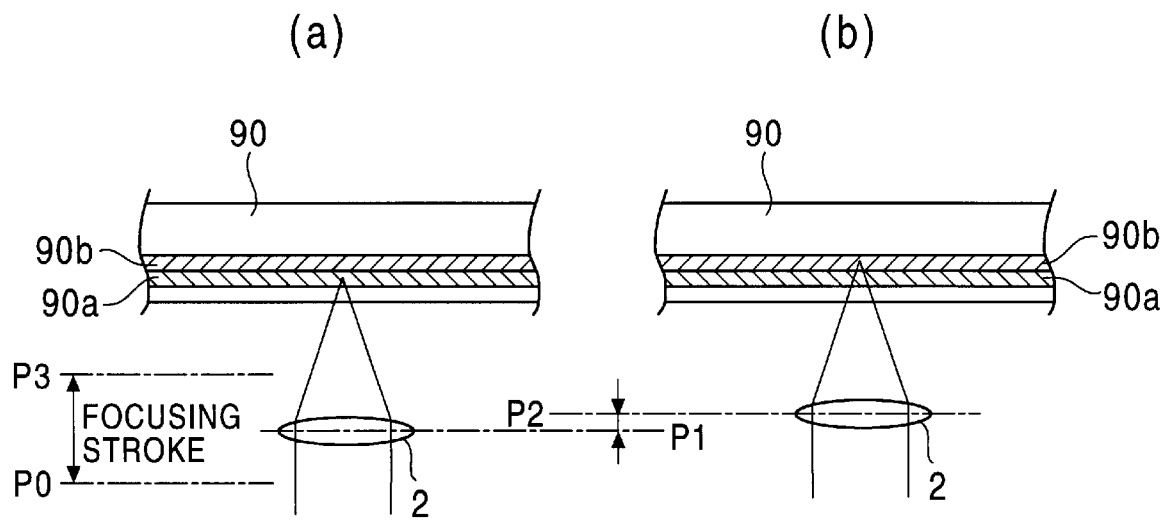
FIG. 2 illustrates a focus jump operation.

In the embodiment, as shown in FIGS. 2A and 2B, the disk 90 has a two-layered structure consisting of a first signal-record surface 90a and a second signal-record surface 90b. In other words, the disk 90 has the structure illustrated in FIG. 7. The first signal-record surface 90a and the second signal-record surface 90b of FIG. 2 correspond to the first signal-record surface 102 and the second signal-record surface 104 of FIG. 7, respectively.

Obviously, when a recording or a reproducing operation is performed on the first signal-record surface 90a, laser beams must be focused on the first signal-record surface 90a. Similarly, when a recording or a reproducing operation is performed on the second signal-record surface 90b, laser beams must be focused on the second signal-record surface 90b.

FIG. 2A shows a state in which the laser beams are focused on the first signal-record surface 90a. In this case, the objective lens 2 is at position P1. On the other hand, FIG. 2B shows a state in which the laser beams are focused on the second signal-record surface 90b. In this case, the objective lens is at position P2. The range between P0 and P3 is a focusing stroke range in which the objective lens 2 can be moved towards or away from the disk 90.

For example, when, after reproducing data from the first signal-record surface 90a, data is to be reproduced from the second signal-record surface 90b, the objective lens 2 needs to be moved from the position P1 to the position P2. In the opposite case, the objective lens 2 needs to be moved from the position P2 to the position P1.

Movement of the focus between the first signal-record surface 90a and the second signal-record surface 90b is achieved by the focus jump operation.

As described above, the focus jump operation is executed by turning off the focus servo and forcing the objective lens 2 to move while laser beams are focused on one of the signal-record surfaces, and then turning on the focus servo at the moment the objective lens 2 moves into the focus draw-in range with respect to the other signal-record surface (that is, at the moment an S-shaped curve is observed).

Figure 3:
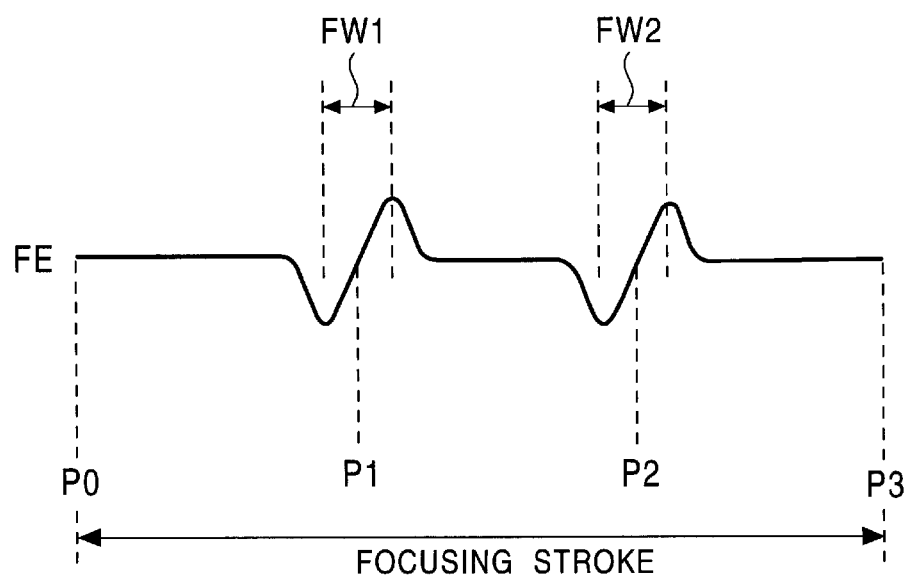
FIG. 3 conceptually illustrates a focus error signal waveform obtained with a disk used in the embodiment of the present invention.

FIG. 3 illustrates an example of a focus error signal FE observed when the objective lens 2 is moved in the focusing stroke range extending from the positions P0 to P3.

As can be seen from FIG. 3, S-shaped curves are observed, with the respective positions P1 and P2 that correspond to the positions allowing laser beams to be focused on the first signal-record surface 90a and the second signal-record surface 90b as centers.

The linear areas of the S-shaped curves are represented, respectively, as FW1 and FW2, which correspond to areas allowing a focusing drawing-in operation to be carried out with respect to each of the signal-record surfaces.

In FIG. 1, the servo processor 14 further supplies the spindle drive signal generated in accordance with the spindle error signal SPE to a spindle motor driver 17. In accordance with the spindle drive signal, the spindle motor drive 17 applies, for example, a three-phase signal to the spindle motor 6 in order to rotate the spindle motor 6 at constant linear velocity (CLV). The servo processor 14 also generates a spindle drive signal in accordance with a spindle kick/brake control signal from the system controller 10, so that the spindle motor 6 is, for example, started up, stopped, accelerated, or decelerated by the spindle motor driver 17.

The spindle motor 6 can be rotated at various linear velocities by the system controller 10.

For example, the decoder 12 generates a reproduction clock signal in synchronism with the EFM signal used in decoding. From the reproduction clock signal, information concerning the current rotational velocity can be obtained. By comparing the current-rotational-velocity information and the standard-rotational-velocity information, the system controller 10 or the decoder 12 generates a spindle error signal SPE for performing a servo operation at CLV. Therefore, by changing the standard-velocity information value, the system controller 11 can change the constant linear speed. For example, a linear speed which is, for example, 4 times or 8 times a certain ordinary linear velocity serving as a standard velocity can be realized.

This makes it possible to achieve a high data transfer rate.

Obviously, when a CAV spindle motor is used, rotational velocities can be switched.

Based on, for example, a sled error signal obtained as a low-region component of the tracking error signal TE, and an access execution control signal from the system controller 10, the servo processor 14 generates a sled drive signal, which is supplied to the sled driver 15. Based on the sled drive signal, the sled driver 15 drives the sled mechanism 8. The sled mechanism 8 includes a main shaft for holding the pickup 1, a sled motor, a transmission gear, etc., none of which component parts are shown. When, based on the sled drive signal, the sled driver 15 drives the sled motor 8, the pickup 1 is moved in a disk radial direction. This displaces the objective lens 2 in the radial direction of the disk.

The laser diode 4 in the pickup 1 is driven by a laser driver 18 by the generation of laser beams.

When reproducing data from the disk 90, the system controller 10 functions to set a laser power control value at an auto-power control circuit 19. Based on the set laser power value, the auto-power control circuit 19 functions to control the laser driver 18 so that laser beams are output.

When recording data, a signal modulated in accordance with recording data is applied to the laser driver 18.

When, for example, a recording operation is performed on the disk 90 allowing recording, the recording data supplied from the host computer 80 to the interface 13 is subjected to, for example, an error correction code adding operation and an EFM+demodulating operation by an encoder (not shown). Thereafter, the recording data that has been subjected to these operations is supplied to the laser driver 18.

Based on the recording data, the laser driver 18 causes the laser diode 4 to generate laser beams, whereby the data is recorded onto the disk 90.

Accordingly, various operations, such as servo operations, encoding, and decoding are controlled by the system controller 10 formed by a microcomputer.

The system controller 10 executes various operations based on commands from the host computer 80.

When, for example, a read command requesting transfer of certain data recorded on the disk 90 is supplied from the host computer 80, a seek operation is controlled with a specified address as a target. In other words, a command is generated to the servo processor 14 in order to cause the pickup 1 to access the target address specified by the seek command.

After the execution of the access operation, the necessary control operation is carried out in order to transfer the specified data in a data section to the host computer 80. In other words, the requested data is transferred by reading out the specified data from the disk 90, decoding it, temporarily storing it, etc.

Requests for data from the host computer 80 are carried out sequentially. When the requested data is previously stored in the cache memory 20 by, for example, a previous reading operation, the requested data transfer operation can be carried out as a cache bit transfer operation without reading out, decoding, temporarily storing data, etc.

In the embodiment, the focus jump operation carried out to move the objective lens 2 between the location allowing a laser spot to be focused on the first signal-record surface and the location allowing the laser spot to be focused on the second signal-record surface is performed in accordance with the controlling operation executed by the system controller 10.

In order for the system controller 10 to control the focus jump sequence, it is actually necessary to monitor the focus error signal FE. Therefore, the focus error signal FE from the RF amplifier is also supplied to the system controller 10. The disk drive device may be constructed so that the system controller 10 monitors the focus error signal FE input to the servo processor 14.

With reference to FIGS. 4 and 5, a description will now be given of an access operation carried out in the disk drive device of the embodiment to access a target location of the signal-record surface which is different from the signal-record surface on which a recording or a reproducing operation is currently being carried out.

FIGS. 4A to 4C and FIGS. 5A to 5C schematically show the positions of a section of the disk 90 and the objective lens 2 relative to each other. For ease of illustration, only the first signal-record surface 90a and the second signal-record surface 90b of the disk 90 are shown.

In the description below, the term "seek" is simply used to mean an operation carried out to move the optical head (or the objective lens 2) roughly to a target address. Therefore, it is sometimes used to mean an operation not particularly including an operation (such as a track jump operation) carried out to precisely move the objective lens 2 to the target address. In contract to this, the term "access" is used to mean an operation, including the above-described seek operation, carried out to precisely move the objective lens 2 to the target address.

Figure 4A:
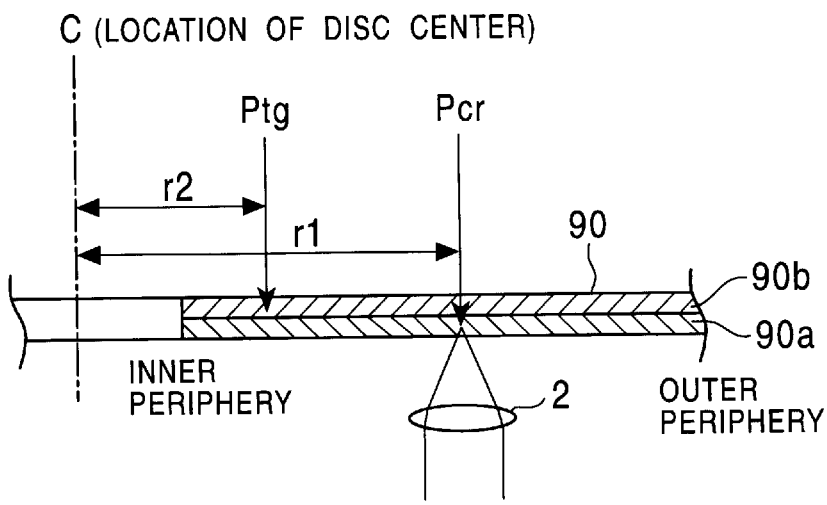
FIGS. 4A to 4C illustrate a seek operation involving movement between signal-record surfaces in the embodiment of the present invention.

As shown in FIG. 4A, an address location (or a current address location) Pcr where a recording or a reproducing operation is currently being carried out is assumed as being at the first signal-record surface 90a, at a radial location of the disk of FIG. 4A. In other words, the laser beams from the objective lens 2 are focused on the first signal-record surface 90a.

In this state, suppose that, for example, there is a request for a read command for performing an access operation from the host computer 80. Here, access is to be made to a target address location Ptg shown in FIG. 4A. In other words, access is to be made to a disk radial location of the second signal-record surface 90b.

Here, the radial distance of the current address location Pcr in FIG. 4A is expressed as r1, while the radial distance of the target address location Ptg is expressed as r2.

When the aforementioned radial distances r1 and r2 are compared, r1>r2

This means that the target address location Ptg is situated closer to the inner peripheral side than the current address location Pcr.

Figure 4B:
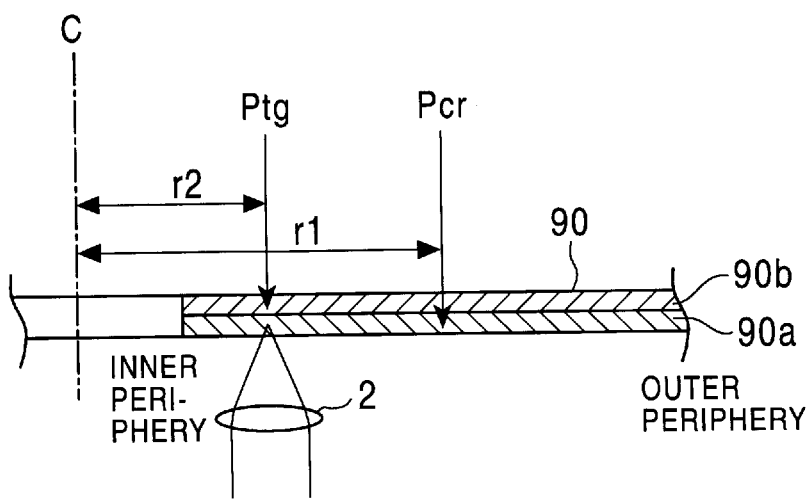

When the address locations have the aforementioned positional relationship, the seek operation carried out to access the target address location Ptg from the current address location Pcr is carried out as follows. As shown in FIG. 4B, from the first signal-record surface 90a where the current address location Pcr is situated, the disk radial location corresponding to the target address location Ptg is sought. Here, the amount of movement (or distance of movement) L for the seek operation is determined by, for example, the following formula:

$$L = r2 - r1$$

In the formula, when the movement amount L is negative, movement is towards the inner periphery of the disk, whereas when the movement amount L is positive, movement is towards the outer periphery of the disk.

Figure 4C:
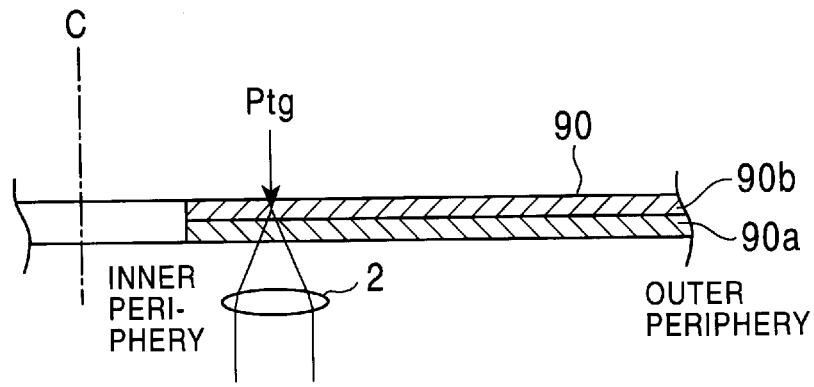

When the seek operation along the signal-record surface where the current address location Pcr (shown in FIG. 4B) is completed, focus jumping is carried out to the disk radial location situated in correspondence with the target address location Ptg. The focus jump operation causes the location where the laser beams are focused to move to a location at the second signal-record surface 90b, as shown in FIG. 4C. At this time, the location where the laser beams are focused is situated near the target address location Ptg. After the focus jump operation, a seek operation (such as a track jump operation) is carried out for the purpose of fine adjustment of the location where the laser beams are focused. Upon completion of the fine adjustment, the access operation to the target address location Ptg is completed.

Figure 5A:
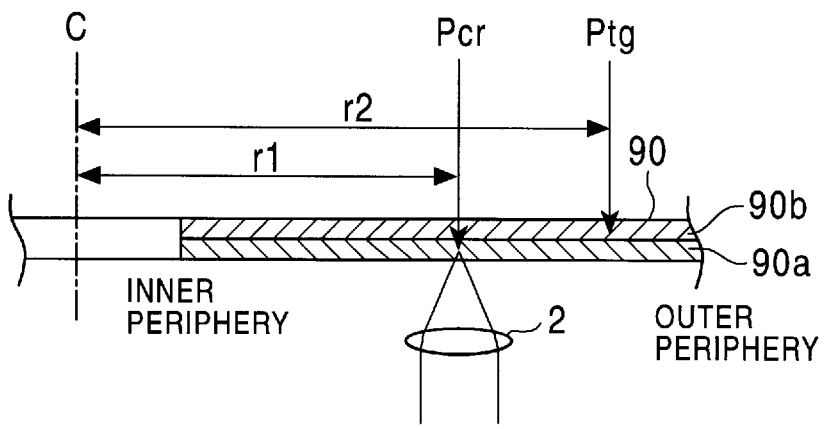
FIGS. 5A to 5C illustrate a seek operation involving movement between signal-record surfaces in the embodiment of the present invention.
Figure 5B:
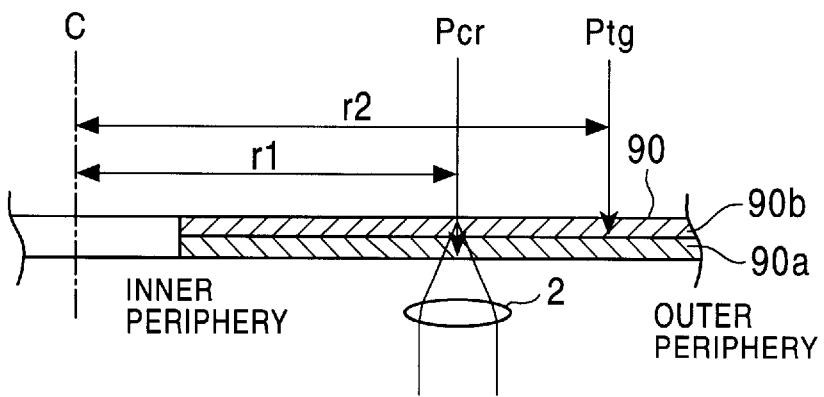
Figure 5C:
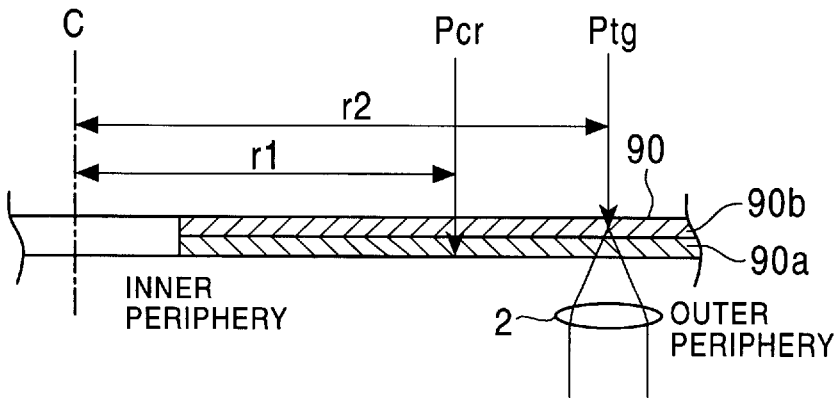

FIGS. 5A to 5C will now be explained. In FIG. 5A, an address location (or a current address location) Pcr where a recording or a reproducing operation is currently being carried out is also assumed as being at the first signal-record surface 90a, at a radial location of the disk.

In FIG. 5A, however, a target address location Ptg is assumed as being at a portion of the second signal-record surface 90b which is closer to the outer periphery of the disk than the portion where the current address location Pcr is situated at the first signal-record surface 90a.

In this case, the radial distance r1 of the current address location Pcr and the radial distance r2 of the target address location Ptg have the following relationship:

r1<r2

When the address locations have this positional relationship, the seek operation carried out to access the target address location Ptg from the current address location Pcr is carried out as follows. As shown in FIG. 5B, focus jumping is carried out from the current address location Pcr (at the first signal-record surface) to the second signal-record surface 90b.

After completion of the focus jump operation, the target address location Ptg at the second signal-record surface 90b is sought, as shown in FIG. 5C.

In this case, the movement amount L required for the seek operation is also determined by the formula L=r2−r1, as in the seek operation illustrated in FIGS. 4A to 4C. Here, the movement amount L is positive.

As in the seek operation illustrated in FIGS. 4A to 4C, after completion of the seek operation, another seek operation (such as a track jump operation) is carried out for the purpose of fine adjustment of the location where the laser beams are focused. Upon completion of the fine adjustment, the access operation to the target address location Ptg is completed.

The seek operations illustrated in FIGS. 4A to 4C and FIGS. 5A to 5C are carried out in accordance with the following rules.

In the case where the current address location Pcr and the target address location Ptg are situated at different signal-record surfaces:

(1) When the target address location Ptg is situated closer to the inner periphery of the disk than the current address location Pcr, a disk radial location situated substantially in correspondence with the target address location Ptg is sought along the signal-record surface where the current address location Pcr is situated. Then, a focus jump operation is executed to move to the signal-record surface where the target address location Ptg is situated.

(2) When the target address location Ptg is situated closer to the outer periphery of the disk than the current address location Pcr, a focus jump operation is executed to move the laser beam spot from the current address location Pcr to the signal-record surface where the target address location Ptg is situated. Then, the target address location Ptg is sought.

In FIGS. 4A to 4B and FIGS. 5A to 5C, the current address location Pcr is situated at the first signal-record layer 90a, while the target address location Ptg is situated at the second signal-record layer 90b. Obviously, when the current address location Pcr is situated at the second signal-record layer 90b and the target address location Ptg is situated at the first signal-record layer 90b, seek operations are also executed according to the rules (1) and (2).

When the above-described seek operations are carried out, focus jumping is carried out to a disk radial location situated in correspondence with whichever of the current address location Pcr and the target address location Ptg that is situated closer to the inner periphery of the disk.

As mentioned above, disk shaking becomes greater towards the outer periphery of the disk. By determining the focus jump location as described above, the probability with which focus jumping is carried out at the outer peripheral side of the disk is reduced, thereby correspondingly reducing the probability with which a focus jump error occurs due to the effects of disk-surface shaking.

Figure 6:
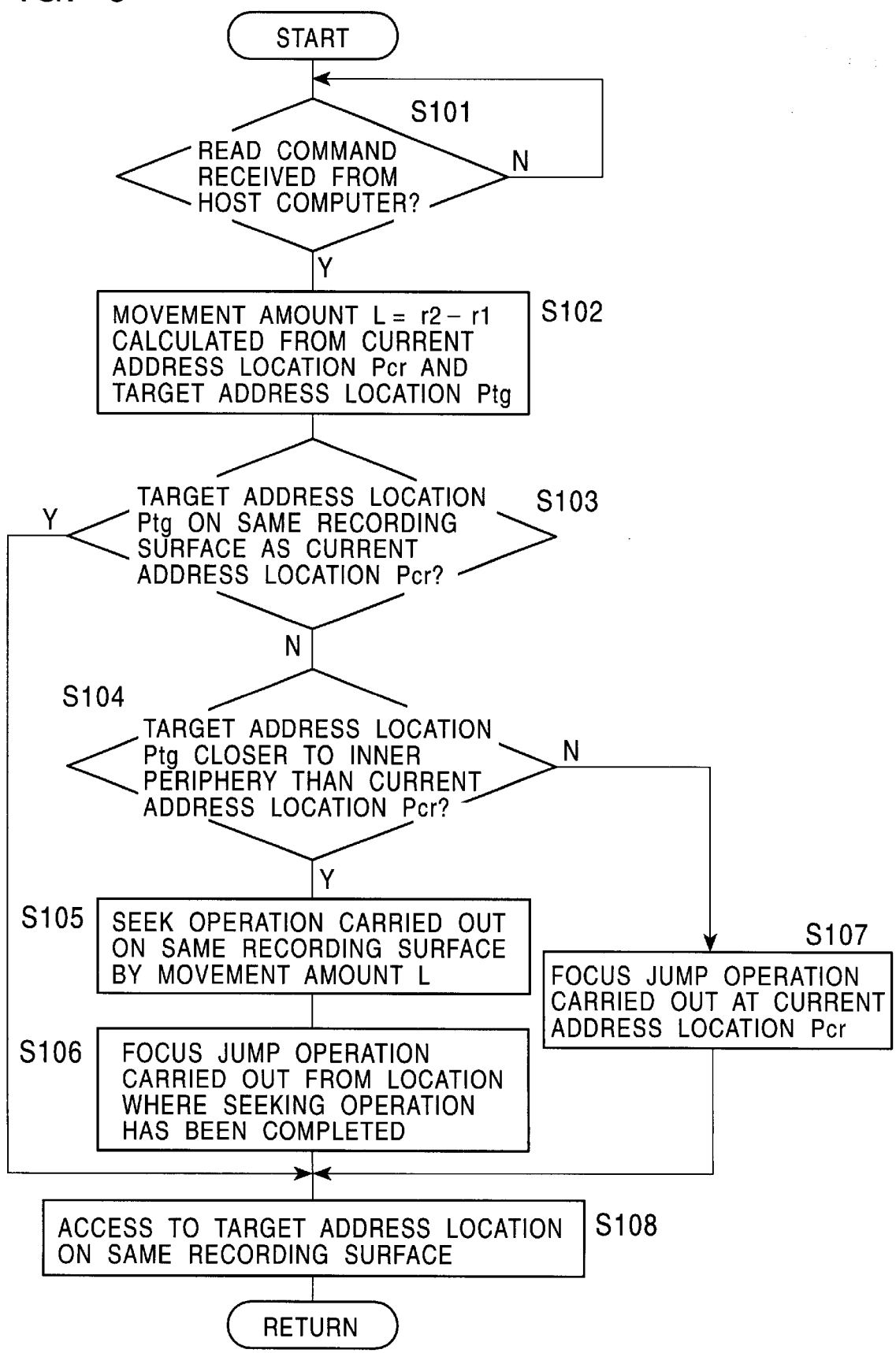
FIG. 6 is a flowchart illustrating the steps carried out to execute an access operation in the embodiment of the present invention.

FIG. 6 is a flowchart illustrating the steps performed to execute an access operation carried out by the disk drive device of the embodiment. The access operation involves movement between the signal-record surfaces illustrated in FIGS. 4A to 4C and FIGS. 5A to 5C. Here, the case where a read command is received to execute a response operation is taken as an example.

In Step S101, the system controller 10 waits to receive a read command from the host computer 80. When the system controller 10 receives the read command, the process proceeds to Step S102.

By the time the process has proceeded to Step S102, the system controller 10 has obtained information concerning the target address location Ptg from the reception of the read command in Step S101. As mentioned above, the target address location Ptg specifies the signal-record surface and the address thereat.

Accordingly, in Step S102, based on the current address location Pcr which was being accessed at the time of the read-command reception, and the target address location Ptg, the movement amount L which is the physical movement distance between the current address location Pcr and the target address location Ptg is determined.

To determine the movement amount L, based on the current address location Pcr, the radial distance r1 thereof on the disk is determined. Similarly, based on the target address location Ptg, the radial distance r2 thereof is obtained. Then, using the obtained radial distances r1 and r2, the movement amount L is obtained using the formula L=r2−r1, as described above.

Disks having two layered signal record surfaces come in two types. In the first type, addresses added to the pieces of data recorded on the second signal-record layer 90b get larger from the inner periphery to the outer periphery of the disk. In the second type, the addresses increase from the outer periphery to the inner periphery of the disk, that is, the addresses are added following the addition of an address to the data at the outermost periphery of the first signal-record layer 90a. Accordingly, in Step S102, based on the information indicating the disk type recorded in a read-in area of the disk previously subjected to a reading operation, the target address location Ptg and the current address location Pcr are made to correspond to actual locations in a radial direction. More specifically, a discrimination is made as to whether an address recorded on the second signal-record layer 90b using the aforementioned disk-type information is represented as being the same as an address recorded on the second signal-record layer 90b, or as being a complement on 1, in the radial location corresponding to the location of the address at the second signal-record layer 90b.

In Step S103, a determination is made as to whether or not the target address location Ptg is situated at the same signal-record surface as the current address location Pcr. In this step, the system controller 10 determines whether or not the target address Ptg indicating the signal-record surface thereof matches the layer data included in the data being reproduced. If it is determined that the target address location Ptg is situated at the same signal-record surface, the process proceeds to Step S108. In contrast, if it is determined that the target address location Ptg is not situated at the same signal-record surface, the process proceeds to Step S104.

In Step S104, a determination is made as to whether or not the target address location Ptg is situated closer to the inner periphery of the disk than the current address location Pcr. The result of the determination can be obtained by comparing the previously obtained radial distances r1 and r2.

If, in Step S104, it is determined that the target address location Ptg is situated closer to the inner periphery of the disk than the current address location Pcr, the process proceeds to Step S105. In contrast, if it is determined that the target address location Ptg is situated closer to the outer periphery of the disk than the current address location Pcr, the process proceeds to Step S107.

From Step S105 onwards, an operation corresponding to the access operation illustrated in FIG. 4 is carried out. From Step S107 onwards, an operation corresponding to the access operation illustrated in FIG. 5 is carried out.

In Step S105, a control operation is executed so that a seek operation is carried out by a movement amount L, at the signal-record surface (where the current address location Pcr is situated) that has been subjected to a reproducing operation. This allows the pickup 1 (or the objective lens 2) to move to a disk radial location near the target address location Ptg.

Here, when the actual control operation, executed to carry out the seek operation by the movement amount L, involves transfer of the pickup 1 by the sled mechanism 8, information concerning the amount of rotation output from a rotary encoder (not shown in FIG. 1) of the sled mechanism 8 is replaced by a sled movement amount, and the pickup 1 is transferred by the sled mechanism 8 until the sled movement amount becomes equal to the movement amount L.

In contrast, if the actual control operation does not involve movement of the sled mechanism 8, so that the movement amount L can be covered by the objective lens 2, the traversed number of tracks, for example, is treated as the amount of movement of the objective lens 2, and the objective lens 2 is moved in a radial direction of the disk until the movement amount of the objective lens 2 equals the movement amount L.

The above-described control operation is similarly executed when a seek operation is carried out during the access operation carried out in Step S108 (described later).

In Step S106, from the sought location, focus jumping is carried out to the signal-record surface where the target address location Ptg is situated. To achieve a focus jump operation such as that illustrated in FIG. 2, the servo processor 14 is made to control the focus servo circuit system by a command from the system controller 10. This also applies to the focus jump operation executed in Step S107 (described later).

The operations carried out from Steps S105 to S106 correspond to the operations illustrated in FIGS. 4A to 4C. Therefore, by the time Step S106 has been completed, the location of the laser spot formed by focusing the laser beams is situated substantially near the target address location Ptg, at the signal-record surface where the target address location Ptg is situated.

When Step S106 is completed, the process proceeds to Step S108.

In Step S107, a control operation is executed to carry out focus jumping from the current address location Pcr to the signal-record surface where the target address location Ptg is situated. The focus jump operation carried out in Step S107 corresponds to the focus jump operation illustrated in FIGS. 5A to 5B. When Step S107 is completed, the process proceeds to Step S108.

By the time Step S108 has been reached, the location of the laser spot is situated at the signal-record surface where the target address location Ptg is situated, regardless of whether Step S108 has been reached from Step S103, Step S106, or Step S107.

In Step S108, a control operation is executed at the signal-record surface where the target address location Ptg is situated in order to access the target address location Ptg.

Here, when Step S108 is reached through Step S106, the access operation involves a relatively small amount of movement. Thus, there is a higher probability that it will be carried out only by moving the objective lens 2, without transferring the pickup 1 by the sled mechanism 8. In contrast to this, when Step S108 has been reached through Step S107, the access operation involves a relatively large movement amount L. Thus, there is a rather higher probability that it will be carried out by executing a seek operation which involves transfer of the pickup 1 by the sled mechanism 8. When Step S108 has been reached through Step S107, the seek operation illustrated using FIGS. 5B and 5C is carried out in Step S108. Similarly, when Step S108 is reached from Step S103, a seek operation involving transfer of the pickup 1 by the sled mechanism 8 may be carried out. In the embodiment, a disk with two layered signal-record surfaces is used as an example. However, the present invention is not limited thereto. The present invention may be applied to a disk with three or more layered signal-record surfaces.

In addition, although in the embodiment the disk drive device is described as being adapted for use with a DVD, it may be adapted for use with disks other than DVDs.

Further, the structure of the disk drive device is not limited to that illustrated in FIG. 1, so that the structure may be variously modified depending on, for example, the actual operating conditions.

What is claimed is:

1. A disk drive device for recording data onto or reproducing data from a disk-shaped recording medium having a layered structure with a plurality of signal-record surfaces by irradiating the signal-record surfaces with laser beams, the disk drive device comprising:

pickup means including at least a laser beam source, an objective lens being an output end of the laser beams, and a detecting section for detecting the laser beams reflected from the recording medium;

objective-lens moving means for setting the objective lens in a focused state with respect to any one of the signal-record surfaces of the recording medium by moving the objective lens towards or away from the recording medium;

focus jump controlling means for controlling the objective-lens moving means so that a location where the objective lens focuses the laser beams jumps from a certain signal-record surface to another signal-record surface;

disk-radial-direction moving means for changing a position of the objective lens relative to the disk-shaped recording medium in a radial direction thereof; and seek operation controlling means for controlling the objective-lens moving means so that the objective lens moves from a current address location where the objective lens is currently focused to a target address location situated at another signal-record surface which is different from the signal-record surface where the current address location is situated;

wherein a first seek controlling operation is executed in which when the seek operation controlling means determines that the target address location is situated closer to an inner periphery of the disk than the current address location, the disk-radial-direction moving means is controlled so that the objective lens moves along the signal-record surface where the current address location is situated to a radial location of the disk-shaped recording medium corresponding to the target address location, and the focus jump controlling means is controlled so that the focus jumping is carried out to the signal-record surface where the target address location is situated from the disk radial location reached after completion of the transferring of the objective lens; and a second seek controlling operation is executed in which when the seek operation controlling means determines that the target address location is situated closer to an outer periphery of the disk than the current address location, the focus jump controlling means is operated so that the focus jumping is carried out from the current address location to a radial location of the signal-record surface where the target address location is situated, and the disk-radial-direction moving means is controlled so that the objective lens moves from the disk radial location reached after completion of the focus jumping to a radial location of the disk-shaped recording medium situated in correspondence with the target address.

2. A disk drive device according to claim 1, wherein, based on the target address location, the current address location, and disk-type data recorded on the disk-shaped recording medium, the seek operation controlling means determines where the target address location is situated in the radial direction of the disk-shaped recording medium with respect to the current address location.

* * * * *